(12) United States Patent
Haro (10) Patent No.: US 12,214,730 B2
(45) Date of Patent: Feb. 4, 2025

(54) DISPLAY SYSTEM FOR WORK MACHINE

(71) Applicant: Caterpillar Paving Products Inc., Brooklyn Park, MN (US)

(72) Inventor: Jason Haro, Dayton, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 18/330,454

(22) Filed: Jun. 7, 2023

(65) Prior Publication Data
US 2024/0409040 A1  Dec. 12, 2024

(51) Int. Cl.
*B60R 11/00* (2006.01)
*B60R 11/02* (2006.01)

(52) U.S. Cl.
CPC ..... *B60R 11/0229* (2013.01); *B60R 2011/004* (2013.01); *B60R 2011/0059* (2013.01); *B60R 2011/0071* (2013.01); *B60R 2011/0085* (2013.01)

(58) Field of Classification Search
None
See application file for complete search history.

(56) References Cited

U.S. PATENT DOCUMENTS

| | | | |
|---|---|---|---|
| 6,199,706 B1 * | 3/2001 | Shea | A47F 5/0807 248/220.42 |
| 6,349,909 B1 * | 2/2002 | Zarrow | A47F 5/0823 248/220.22 |
| 8,251,325 B2 | 8/2012 | Molter | |
| 8,490,934 B2 | 7/2013 | Dittmer | |
| 9,671,063 B2 * | 6/2017 | Mason | F16M 11/048 |
| 10,226,138 B2 * | 3/2019 | Tear | A47F 5/0823 |
| 11,304,545 B2 * | 4/2022 | Currey | A47F 5/0823 |
| 11,332,013 B2 | 5/2022 | Haro | |
| 2001/0047972 A1 * | 12/2001 | Plutsky | A47F 5/083 211/184 |
| 2003/0071181 A1 * | 4/2003 | Valiulis | A47F 5/0823 248/222.51 |
| 2012/0018601 A1 * | 1/2012 | DeVito | A47F 5/0807 248/220.42 |

FOREIGN PATENT DOCUMENTS

| | | |
|---|---|---|
| CN | 106224734 B | 8/2019 |
| CN | 213958467 U | 8/2021 |

* cited by examiner

*Primary Examiner* — Steven M Marsh (57) ABSTRACT

A bracket for removably coupling a display device with a work machine includes a first member defining a first portion and a second portion spaced apart from the first portion along a longitudinal axis. The bracket also includes a second member coupled to the first member at the second portion thereof. The second member is substantially orthogonal to the first member. The second member defines a third portion and a fourth portion that are spaced apart from each other along a vertical axis that is orthogonal to the longitudinal axis. The bracket further includes at least one coupling element extending from and coupled to the second member at the third portion thereof. The bracket includes at least one projection coupled to the second member at the fourth portion thereof.

14 Claims, 6 Drawing Sheets

DISPLAY SYSTEM FOR WORK MACHINE

TECHNICAL FIELD

The present disclosure relates to a bracket for removably coupling a display device with a work machine, a system for removably coupling the display device with the work machine, and a display system for the work machine.

BACKGROUND

Work machines, for example, cold planers, are widely used for purposes, such as recycling and/or reclaiming materials from various surfaces. Such machines typically include one or more display systems having a display and/or a touchscreen, switches, indicators, levers, touchscreens, etc. that may assist operators in controlling the work machine to perform one or more machine operations.

Such display systems may be present inside an operator station of the work machine. In some cases, the display system may be present outside of the operator station, such that the display system may be accessible by operators standing on a ground surface. Each operator may have different preference in terms of a location of the display system on the work machine based on, for example, a build of the operator, ease of accessibility, and the like. Further, each work machine may be operable by different operators, and it may be desirable to adjust the display system to a preference of the operator assigned to the work machine, to enhance operator experience and comfort. Conventional display systems may be cumbersome and tedious to use and adjust by operators. Particularly, techniques used to adjust a position/location of conventional display systems may be time consuming and may require additional tools.

CN106224734B describes a continuous adjusting and clamping mechanism for a display support. The continuous adjusting and clamping mechanism comprises a supporting base, a connecting base and a tightening screw. The supporting base comprises an upper pressing plate and a side plate; the connecting base is connected to the side plate and is provided with at least one connecting column; a plurality of connecting holes for containing connecting columns are formed in the side plate in the height direction; the connecting columns penetrate through the connecting holes to connect the connecting base to the side plate; the extending ends of the connecting columns are provided with limiting column heads used for preventing the connecting columns from being disengaged from the connecting holes; at least two channels having different heights and used for enabling the connecting holes to communicate with one another are further arranged on the side plate; and the channels are used for enabling the connecting columns to move to another connecting hole from one connecting hole without being disengaged from the side plate. According to CN106224734B, in the continuous adjusting and clamping mechanism for the display support the positions of the connecting holes, in the height direction of the supporting base, of the connecting base can be adjusted freely, so that the lower connecting base does not need to be dismounted, and the mounting efficiency is improved.

SUMMARY OF THE DISCLOSURE

In an aspect of the present disclosure, a bracket for removably coupling a display device with a work machine is provided. The bracket includes a first member defining a first portion and a second portion spaced apart from the first portion along a longitudinal axis. The bracket also includes a second member coupled to the first member at the second portion thereof. The second member is substantially orthogonal to the first member. The second member defines a third portion and a fourth portion that are spaced apart from each other along a vertical axis that is orthogonal to the longitudinal axis. The bracket further includes at least one coupling element extending from and coupled to the second member at the third portion thereof. The bracket includes at least one projection coupled to the second member at the fourth portion thereof.

In another aspect of the present disclosure, a system for removably coupling a display device with a work machine is provided. The system includes a bracket. The bracket includes a first member defining a first portion and a second portion spaced apart from the first portion along a longitudinal axis. The bracket also includes a second member coupled to the first member at the second portion thereof. The second member is substantially orthogonal to the first member. The second member defines a third portion and a fourth portion that are spaced apart from each other along a vertical axis that is orthogonal to the longitudinal axis. The bracket further includes at least one coupling element extending from and coupled to the second member at the third portion thereof. The bracket includes at least one projection coupled to the second member at the fourth portion thereof. The system also includes a mounting plate removably coupled with the bracket. The mounting plate defines a number of openings therein. The at least one coupling element passes through at least one of the plurality of openings in the mounting plate to removably couple the bracket with the mounting plate. The system further includes a backer plate removably coupled with each of the bracket, the mounting plate, and the work machine. The at least one projection is adapted to pass through at least one of the plurality of openings in the mounting plate to contact the backer plate removably couple the bracket with the backer plate.

In yet another aspect of the present disclosure, a display system for a work machine is provided. The display system includes a display device having a clamping element. The display system also includes a system for removably coupling the display device with the work machine. The system includes a bracket. The bracket includes a first member defining a first portion and a second portion spaced apart from the first portion along a longitudinal axis. The bracket also includes a second member coupled to the first member at the second portion thereof. The second member is substantially orthogonal to the first member. The second member defines a third portion and a fourth portion that are spaced apart from each other along a vertical axis that is orthogonal to the longitudinal axis. The bracket further includes at least one coupling element extending from and coupled to the second member at the third portion thereof. The bracket includes at least one projection coupled to the second member at the fourth portion thereof. The system also includes a mounting plate removably coupled with the bracket. The mounting plate defines a number of openings therein. The at least one coupling element passes through at least one of the plurality of openings in the mounting plate to removably couple the bracket with the mounting plate. The system further includes a backer plate removably coupled with each of the bracket, the mounting plate, and the work machine. The at least one projection is adapted to pass through at least one of the plurality of openings in the mounting plate to contact the backer plate removably couple the bracket with the backer plate.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
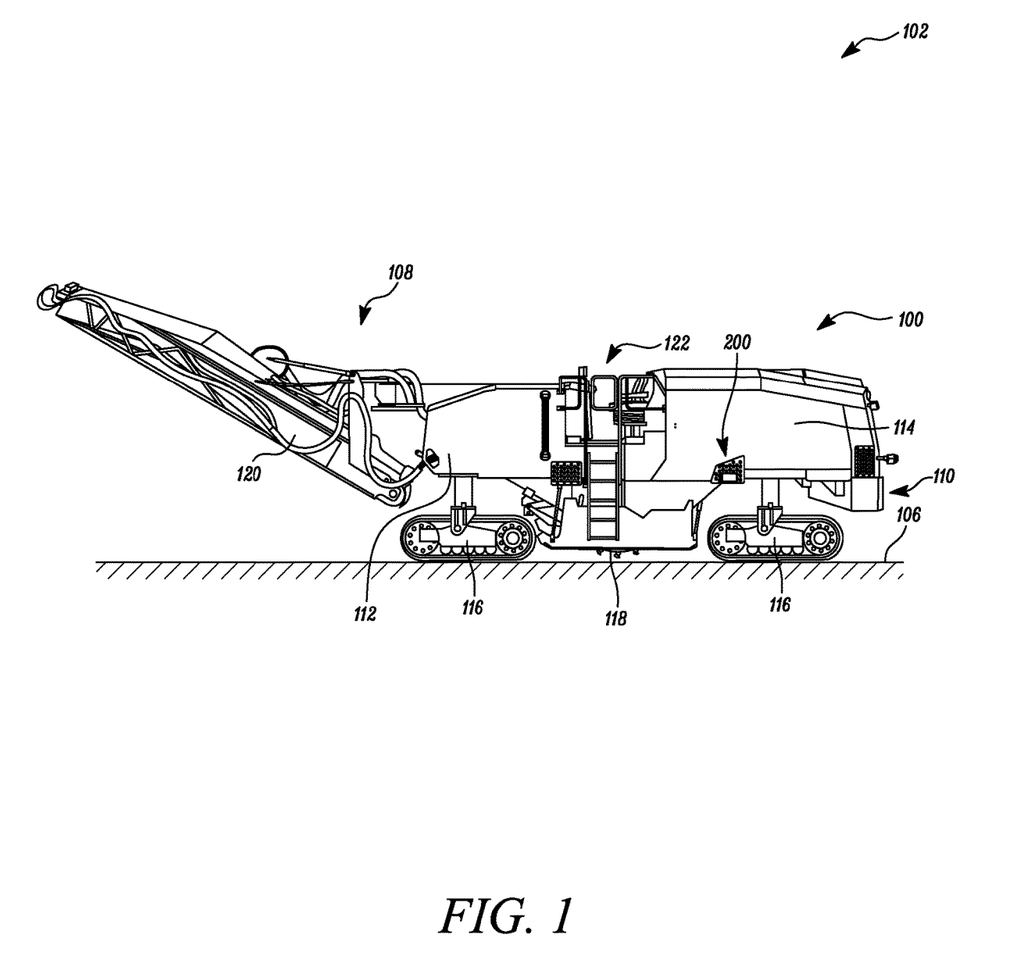
FIG. 1 is a schematic side view of a work machine, according to an example of the present disclosure.

Referring to FIG. 1, a schematic side view of an exemplary work machine 100 is illustrated. The work machine 100 may perform one or more work operations associated with an industry, such as, mining, construction, farming, transportation, or any other industry known in the art. The work machine 100 is operating at a worksite 102. The worksite 102 may include, for example, a mine site, a quarry, a construction site, or any other type of worksite.

The work machine 100 is embodied as a cold planer herein. The work machine 100 may be used to remove, mix, or reclaim material from a surface 106 at the worksite 102. The surface 106 may include, for example, a roadway. Alternatively, the work machine 100 may include a paving machine, a dozer, an excavator, a grader, and the like, without any limitations.

The work machine 100 defines a front end 108 and a rear end 110 (these ends are defined with reference to the work machine 100 traveling toward the left side of the page). The work machine 100 includes a frame 112 that supports various machine components thereon. The work machine 100 further includes a power source (not shown) that generates power. The power source may be an engine, such as, an internal combustion engine (e.g., a compression ignition diesel engine), a battery module, a fuel cell, or combinations thereof. The power source may be mounted on the frame 112 and enclosed within an enclosure 114 proximal to the rear end 110. The work machine 100 also includes a number of ground engaging members 116. Each ground engaging member 116 is embodied as a track herein. Alternatively, the work machine 100 may include wheels or drums instead of tracks.

The work machine 100 further includes a rotatable work tool 118 for milling the surface 106. The rotatable work tool 118 may include a rotatable drum (also known as a rotor) and a number of cutting tools disposed on the rotatable drum. The work machine 100 further includes a loading conveyor 120 at the front end 108. After being cut by the rotatable work tool 118, material removed from the surface 106 may enter the loading conveyor 120 which may transfer the removed material into a dump truck (not shown) or other suitable machine for transporting the material. In some cases, the removed material can also be cast off to a side for pick-up or re-use at the worksite 102.

The work machine 100 further includes an operator station 122 supported by the frame 112. An operator of the work machine 100 may sit or stand in the operator station 122 to oversee machine operations. The operator station 122 provides a platform/station that can be accessed by operators to operate the work machine 100. The operator station 122 may include various control devices that may be used for controlling one or more operations of the work machine 100. The different control devices may include, but are not limited to, pedals, levers, switches, buttons, wheels, display systems, and the like.

Figure 2:
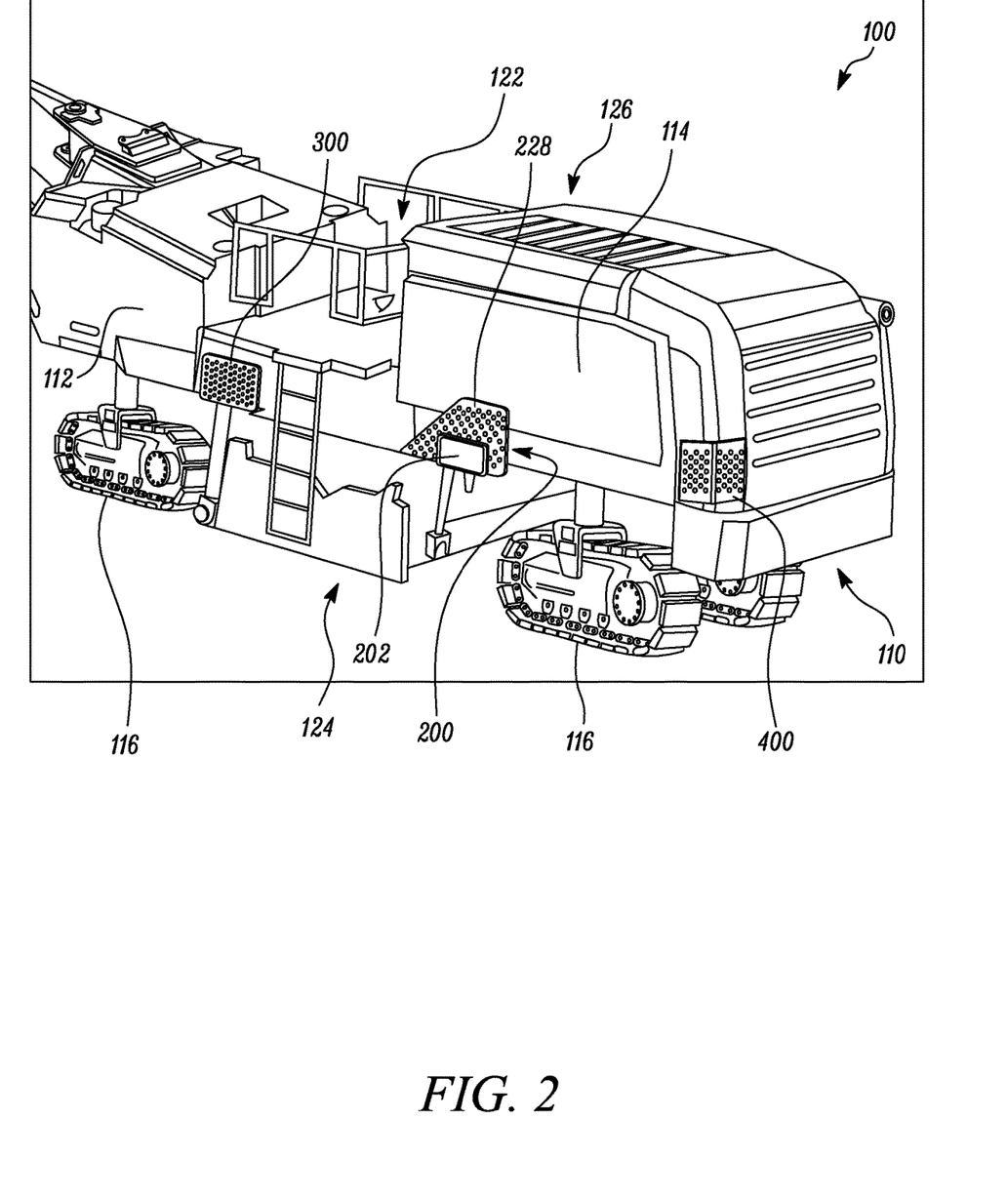
FIG. 2 is a schematic side perspective view of a portion of the work machine of FIG. 1.

FIG. 2 illustrates a portion of the work machine 100. As shown in FIG. 2, the work machine 100 includes a display system 200. The display system 200 may be disposed at a first side 124 of the work machine 100 or a second side 126 of the work machine 100. The display system 200 may be coupled to the enclosure 114 of the work machine 100 or to the frame 112 of the work machine 100. In other examples, the display system 200 may be disposed within the operator station 122. The display system 200 may facilitate reception of inputs from the operator and provide outputs for controlling of the one or more operations of the work machine 100.

The display system 200 includes a display device 202. The display device 202 may include any type of display screen, a touchscreen, a monitor, a display panel, and the like. The display device 202 may be removably coupled to the work machine 100 at a number of locations. For example, the display device 202 may be disposed at the first side 124 and/or the second side 126. Moreover, the display device 202 may be disposed proximate to the rear end 110, for example, on the enclosure 114. Alternatively, the display device 202 may be disposed on the frame 112, proximate to stairs that lead to the operator station 122. In the illustrated example, the display device 202 is disposed on a portion of the enclosure 114 that is proximal to the operator station 122.

Figure 3:
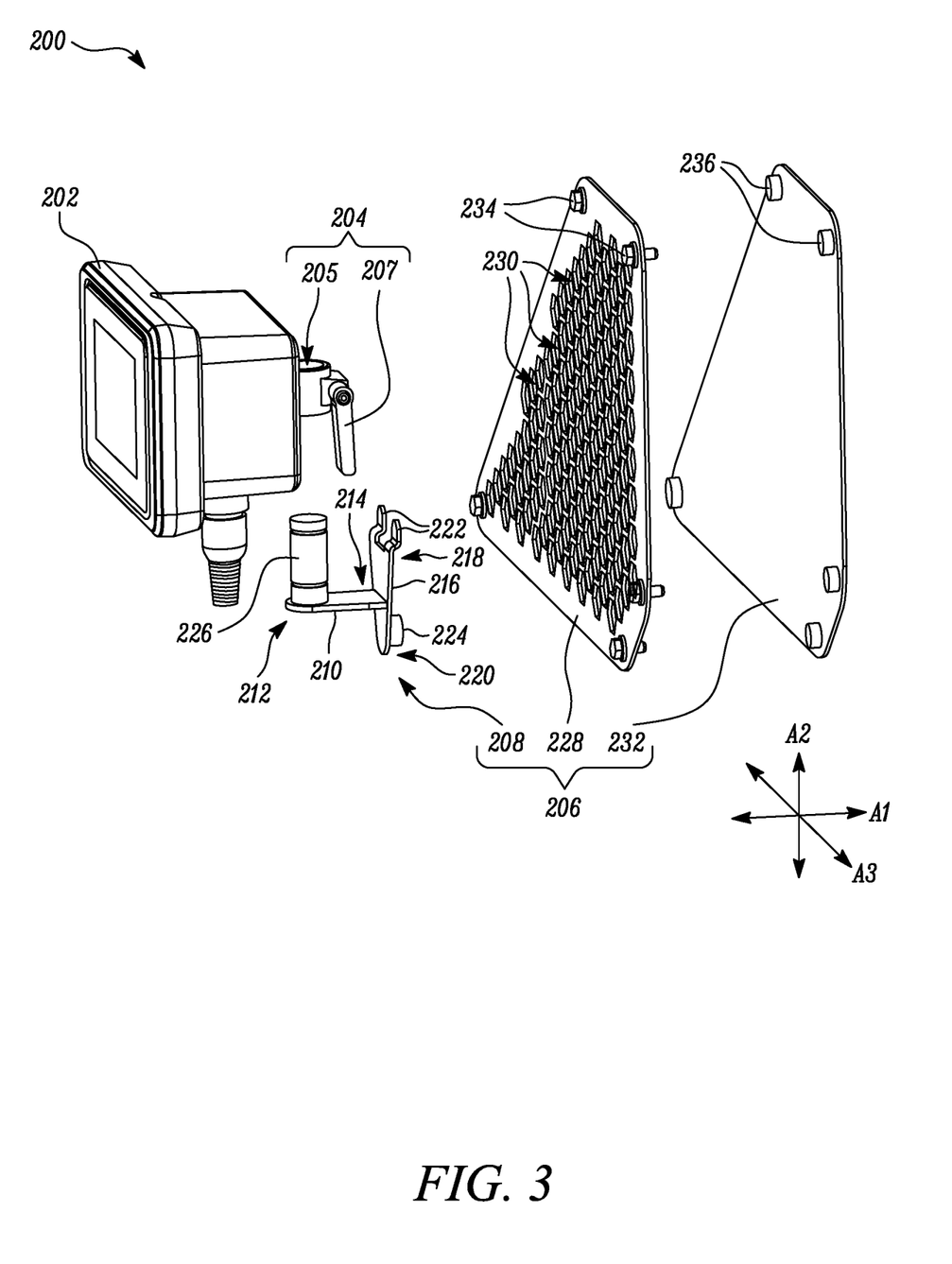
FIG. 3 is an exploded view of a display system for the work machine of FIGS. 1 and 2, according to an example of the present disclosure.

Referring to FIG. 3, the display device 202 includes a clamping element 204. The clamping element 204 is cylindrical in shape and defines a channel 205 therethrough. Further, the clamping element 204 includes a lever 207 that is movable between a first position and a second position.

The display system 200 also includes a system 206 for removably coupling the display device 202 with the work machine 100. The system 206 includes a bracket 208 for removably coupling the display device 202 with the work machine 100. The bracket 208 includes a first member 210. The first member 210 defines a first portion 212 and a second portion 214 spaced apart from the first portion 212 along a longitudinal axis A1.

The bracket 208 also includes a second member 216 coupled to the first member 210 at the second portion 214 thereof. The first and second members 210, 216 are fixedly coupled to each other. In an example, the first member 210 may be integral with the second members 216. Alternatively, the first and second members 210, 216 may be manufactured as separate components and connected to each other by any joining technique, such as, welding, soldering, and the like. The second member 216 is substantially orthogonal to the first member 210. The second member 216 defines a third portion 218 and a fourth portion 220 that are spaced apart from each other along a vertical axis A2 that is orthogonal to the longitudinal axis A1. Each of the first and second members 210, 216 are embodied as plates herein and have a substantially U-shaped design.

The bracket 208 further includes one or more coupling elements 222 extending from and coupled to the second member 216 at the third portion 218 thereof. In the illustrated example of FIG. 3, the coupling elements 222 includes a pair of coupling elements 222. The pair of coupling elements 222 are embodied as tangs that allow the display device 202 to couple with the work machine 100. In some other examples, the coupling elements 222 may include a single coupling element or more than two coupling elements, without any limitations. In an example, the coupling elements 222 may be integral with the second member 216. Alternatively, the coupling elements 222 and the second member 216 may be manufactured as separate components and connected to each other by any joining technique, such as, welding, soldering, and the like.

Further, the bracket 208 includes one or more projections 224 coupled to the second member 216 at the fourth portion 220 thereof. In the illustrated example of FIG. 3, the one or more projections 224 includes a single projection 224. Alternatively, the one or more projections 224 may include two or more projections, without any limitations.

In one example, the one or more projections 224 includes a magnet. In another example, the one or more projections 224 includes a compressible material. Further, the projection 224 has a cylindrical shape herein. Alternatively, the projection 224 may have a square shape, a rectangular shape, a hexagonal shape, and the like. The projection 224 is coupled to the second member 216 via a fastener 225 (shown in FIG. 4). The fastener 225 may include a bolt, a pin, a screw, and the like.

The bracket 208 also includes a mounting member 226 coupled to the first member 210 proximal to the first portion 212 thereof. The mounting member 226 extends along the vertical axis A2. In other words, the mounting member 226 and the second member 216 are disposed in parallel to each other. In an example, the first member 210 may be integral with the mounting member 226. Alternatively, the first member 210 and the mounting member 226 may be manufactured as separate components and connected to each other by any joining technique, such as, welding, soldering, and the like.

The mounting member 226 removably couples the bracket 208 with the display device 202. The mounting member 226 is removably coupled with the clamping element 204 of the display device 202 such that display device 202 is rotatable about the vertical axis A2. Specifically, the mounting member 226 is at least partially received within the channel 205 of the clamping element 204 to removably couple the display device 202 with the bracket 208. Further, a position of the display device 202 with respect to the bracket 208 may be adjusted based on the rotation of the clamping element 204 about the vertical axis A2. Furthermore, the lever 207 of the clamping element 204 may be movable between the first position and the second position. In the first position, the lever 207 may prevent any movement of the clamping element 204 relative to the mounting member 226. Further, the clamping element 204 may be rotated relative to the mounting member 226 when the lever 207 is in the second position.

In the illustrated example of FIG. 3, the mounting member 226 is cylindrical in shape. It should be noted that the clamping element 204 and the mounting member 226 have similar cross-sections. In the illustrated example of FIG. 3, each of the clamping element 204 and the mounting member 226 have a circular cross-section. Alternatively, the clamping element 204 and the mounting member 226 may have a square cross-section, rectangular cross-section, or any other cross-section, as per application attributes. Additional structure may be, for example, included within the clamping element 204 or the mounting member 226 to facilitate relative rotation between the clamping element 204 and the mounting member 226. Further, the first member 210, the second member 216, the coupling elements 222, and the mounting member 226 may be made of a metallic material, such as, a ferrous material.

Further, the bracket 208 is removably coupled to the work machine 100 via a mounting plate 228 and a backer plate 232. Specifically, the system 206 includes the mounting plate 228 removably coupled with the bracket 208. In the illustrated example of FIG. 3, the mounting plate 228 is substantially trapezoidal in shape. However, the mounting plate 228 may have any other shape, for example, a square shape, a rectangular shape, a circular shape, and the like. The mounting plate 228 defines a number of openings 230 therein. In some examples, each of the number of openings 230 may be polygon shaped. In the illustrated example of FIG. 3, each of the number of openings 230 is hexagon shaped. In other examples, each of the number of openings 230 may be pentagon shaped, square shaped, rectangular shaped, and the like. The one or more openings 230 form a grid which is substantially similar to a shape of the mounting plate 228.

The system 206 further includes the backer plate 232. The backer plate 232 is removably coupled with each of the bracket 208, the mounting plate 228, and the work machine 100 (see FIG. 1). In some examples, the shape of the mounting plate 228 is the same as a shape of the backer plate 232. In the illustrated example of FIG. 3, the backer plate 232 is substantially trapezoidal in shape similar to the shape of the mounting plate 228. In other examples, the mounting plate 228 and the backer plate 232 may have different shapes.

Figure 4:
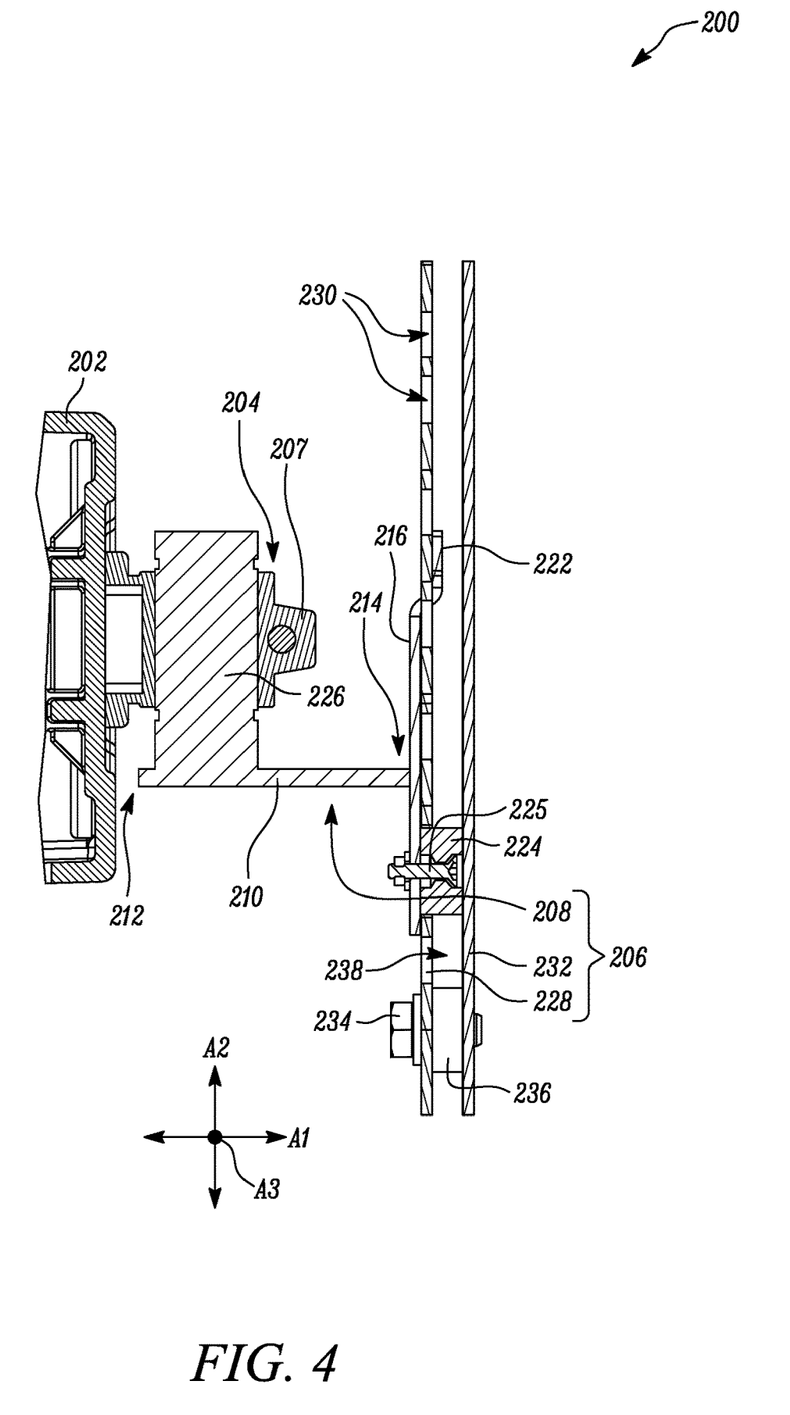
FIG. 4 is a schematic sectional side view of the display system of FIG. 3.

Referring now to FIGS. 3 and 4, the system 206 includes a number of fastening means 234. Specifically, the system 206 includes five fastening means 234. The fastening means 234 may be a bolt, a screw, a rivet, a pin, and the like. The fastening means 234 couple the mounting plate 228 and the backer plate 232 with the work machine 100 (see FIG. 1). Further, the backer plate 232 includes a number of bushings 236 corresponding to the number of fastening means 234. Specifically, the backer plate 232 includes five bushings 236 extending therefrom. When the mounting plate 228 is coupled to the backer plate 232, the bushings 236 separate the mounting plate 228 from the backer plate 232 such that a gap 238 is defined between the mounting plate 228 and the backer plate 232. Thus, the bushings 236 prevent a full surface contact between the mounting plate 228 and the backer plate 232, and allow accommodation of the projection 224 between the mounting plate 228 and the backer plate 232.

Figure 5:
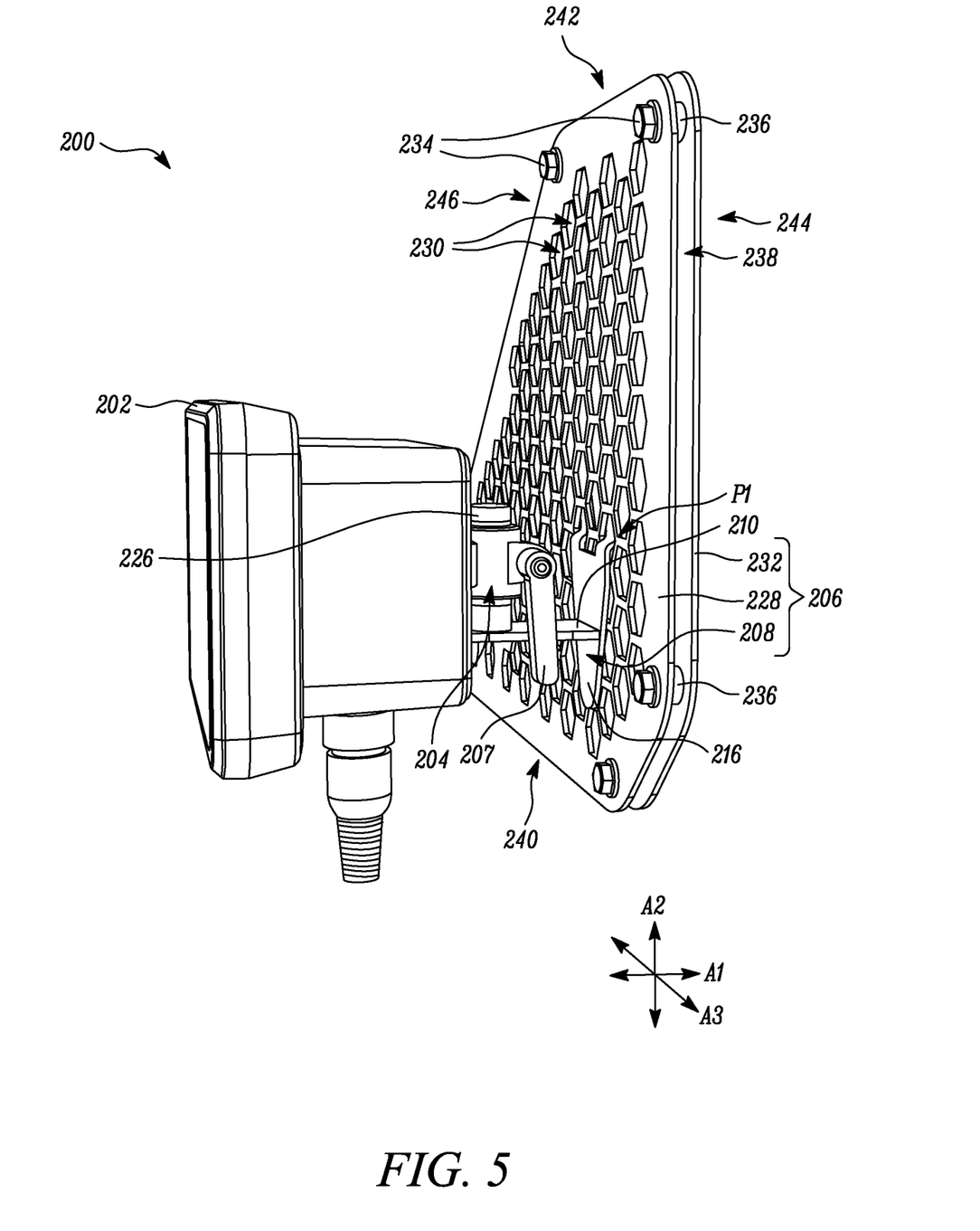
FIG. 5 is a schematic side perspective view of the display system of FIG. 3.

Referring now to FIG. 5, the one or more coupling elements 222 engage one or more of the number of openings 230 of the mounting plate 228 to removably couple the bracket 208 with the mounting plate 228. Specifically, the one or more coupling elements 222 passes through one or more of the number of openings 230 in the mounting plate 228 to removably couple the bracket 208 with the mounting plate 228. In the illustrated example of FIG. 5, each coupling element 222 passes through a corresponding opening 230 in the mounting plate 228 to removably couple the bracket 208 with the mounting plate 228. This way the display device 202 is removably coupled with the work machine 100 (see FIG. 1).

Figure 6:
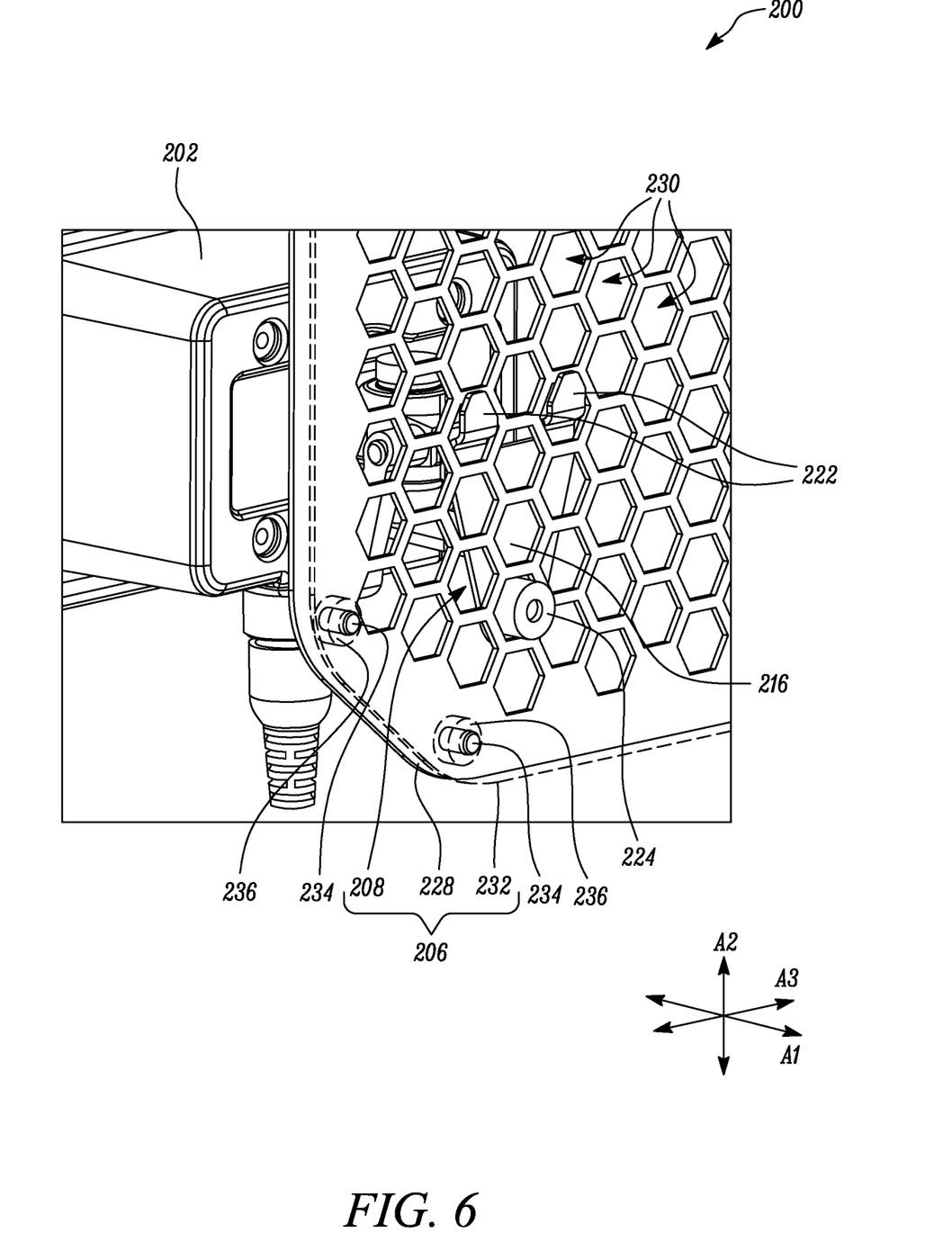
FIG. 6 is a schematic rear perspective view of the display system of FIG. 3.

FIG. 6 is a schematic rear perspective view of a portion of the display system 200. It should be noted that the backer plate 232 is shown as transparent in FIG. 6 to depict details of the components behind the backer plate 232. Referring to FIGS. 4 and 6, the one or more projections 224 contact, through another of the number of openings 230, with the backer plate 232 to removably couple the bracket 208 with the backer plate 232. Specifically, the one or more projections 224 pass through one or more of the number of openings 230 in the mounting plate 228 to contact the backer plate 232 to removably couple the bracket 208 with the backer plate 232. Thus, the coupling elements 222 and the projection 224 together prevent any movement of the bracket 208 relative to the mounting plate 228 and the backer plate 232.

In the example wherein the projection 224 includes the magnet, the projection 224 may be retained on the backer plate 232 by a magnetic force. Further, the mounting plate 228 and the backer plate 232 may be made of a metallic material, for example, a ferrous material. Due to the material of the mounting plate 228 and the backer plate 232, the projection 224 embodied as the magnet may be coupled with each of the mounting plate 228 and the backer plate 232 by the magnetic force thereby removably coupling the bracket 208 with the backer plate 232.

In the example wherein the projection 224 includes the compressible material, the projection 224 may have a dimension greater than a dimension of the number of openings 230 defined in a mounting plate 228. Further, the projection 224 may pass through and be compressed within the opening 230. This way, the projection 224 may be retained within the opening 230 and contact the backer plate 232.

As shown in FIG. 5, based on the removable coupling of the bracket 208 with the mounting plate 228 and the backer plate 232, the bracket 208 is disposable at a number of positions (for example, a position P1) along the vertical axis A2 and a lateral axis A3 to adjust a placement of the display device 202. The lateral axis A3 is orthogonal to the longitudinal axis A1 and the vertical axis A2. In other words, the number of openings 230 in the mounting plate 228 allow removable coupling of the display device 202 at the number of positions along the vertical axis A2 and the lateral axis A3. Further, the bracket 208 is connected to the mounting plate 228 at the position P1 that is closer to a bottom side 240 of the mounting plate 228. In other examples, the bracket 208 may be connected to the mounting plate 228 at another position that may be closer to an upper side 242 of the mounting plate 228, a first side 244 of the mounting plate 228, or a second side 246 of the mounting plate 228, as per operator preference. Further, the bracket 208 may also be connected to the mounting plate 228 at a central position of the mounting plate 228, without any limitations.

Referring now to FIG. 2, the system 206 may include mounting plates 228, 300, 400 of different shapes and sizes. In the illustrated example of FIG. 2, the mounting plate 300 has a rectangular shape. It should be noted that a backer plate (not shown) may be disposed behind the mounting plate 300. The backer plate may have a shape and a size similar to the mounting plate 300.

Further, in the illustrated example of FIG. 2, the mounting plate 400 includes a pair of plates that are substantially rectangular in shape. Moreover, the pair of plates are angularly disposed relative to each other so as to conform with a shape of the enclosure 114. It should be noted that a backer plate (not shown) may be disposed behind the mounting plate 400. The backer plate may have a shape and a size similar to the mounting plate 400.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The display system 200 of the present disclosure includes the bracket 208 that removably couples the display device 202 with the work machine 100. The one or more coupling elements 222 of the bracket 208 allows the bracket 208 to be disposed at multiple positions (such as, the position P1) along the vertical axis A2 and the lateral axis A3 which may in turn allow the display device 202 to be disposed at multiple positions, as per operator preference. Thus, the display system 200 may be usable by different operators as per their body build and preferences, thereby improving flexibility of the display system 200. Moreover, the mounting member 226 of the bracket 208 may allow the display device 202 to rotate relative to the bracket 208, which may further improve flexibility of the display system 200

Further, in some examples, the work machine 100 may include multiple mounting plates 228, 300, 400 and backer plates (such as, the backer plate 232) at the first and second sides 124, 126 of the work machine 100. Furthermore, a single display device or multiple display devices may be connectable to such mounting plates 228, 300, 400 and backer plates to cater to different operators.

Moreover, the display system 200 described herein may be easy to use, simple in construction, cost-effective, and may enhance operator experience and comfort. The display system 200 allows coupling of the display device 202 in a time efficient manner without usage of additional components or set-ups. For example, the bracket 208 may be easily coupled at multiple positions on the mounting plates 228, 300, 400 without tightening or loosening of coupler or fasteners.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A system for removably coupling a display device with a work machine, the system comprising:
    a bracket including:
        a first member defining a first portion and a second portion spaced apart from the first portion along a longitudinal axis;
        a second member coupled to the first member at the second portion thereof, wherein the second member is substantially orthogonal to the first member, the second member defining a third portion and a fourth portion that are spaced apart from each other along a vertical axis that is orthogonal to the longitudinal axis;
        at least one coupling element extending from and coupled to the second member at the third portion thereof; and
        at least one projection coupled to the second member at the fourth portion thereof;
    a mounting plate removably coupled with the bracket, the mounting plate defining a plurality of openings therein, wherein the at least one coupling element passes through at least one of the plurality of openings in the mounting plate to removably couple the bracket with the mounting plate; and
    a backer plate removably coupled with each of the bracket, the mounting plate, and the work machine, wherein the at least one projection is adapted to pass through at least one of the plurality of openings in the mounting plate to contact the backer plate to removably couple the bracket with the backer plate.

2. The system of claim 1, wherein, based on the removable coupling of the bracket with the mounting plate and the backer plate, the bracket is disposable at a plurality of positions along the vertical axis and a lateral axis to adjust a placement of the display device, and wherein the lateral axis is orthogonal to the longitudinal axis and the vertical axis.

3. The system of claim 1, wherein each of the plurality of openings is hexagon shaped.

4. The system of claim 1, wherein a shape of the mounting plate matches a shape of the backer plate.

5. The system of claim 1, wherein the bracket further includes a mounting member coupled to the first member proximal to the first portion thereof, wherein the mounting member extends along the vertical axis, and wherein the mounting member removably couples the bracket with the display device.

6. The system of claim 5, wherein the display device includes a clamping element, and wherein the mounting member is adapted to be removably coupled with the clamping element of the display device such that display device is rotatable about the vertical axis.

7. The system of claim 5, wherein the at least one projection includes a magnet.

8. The system of claim 1, wherein the at least one coupling element includes a pair of coupling elements.

9. A display system for a work machine, the display system comprising:
    a display device including a clamping element; and
    a system for removably coupling the display device with the work machine, the system including:
        a bracket including:
            a first member defining a first portion and a second portion spaced apart from the first portion along a longitudinal axis;
            a second member coupled to the first member at the second portion thereof, wherein the second member is substantially orthogonal to the first member, the second member defining a third portion and a fourth portion that are spaced apart from each other along a vertical axis that is orthogonal to the longitudinal axis;
            at least one coupling element extending from and coupled to the second member at the third portion thereof; and
            at least one projection coupled to the second member at the fourth portion thereof;
        a mounting plate removably coupled with the bracket, the mounting plate defining a plurality of openings therein, wherein the at least one coupling element passes through at least one of the plurality of openings in the mounting plate to removably couple the bracket with the mounting plate; and
        a backer plate removably coupled with each of the bracket, the mounting plate, and the work machine, wherein the at least one projection is adapted to pass through at least one of the plurality of openings in the mounting plate to contact the backer plate to removably couple the bracket with the backer plate.

10. The display system of claim 9, wherein, based on the removable coupling of the bracket with the mounting plate and the backer plate, the bracket is disposable at a plurality of positions along the vertical axis and a lateral axis to adjust a placement of the display device, and wherein the lateral axis is orthogonal to the longitudinal axis and the vertical axis.

11. The display system of claim 9, wherein the bracket further includes a mounting member coupled to the first member proximal to the first portion thereof, and wherein the mounting member extends along the vertical axis.

12. The display system of claim 11, wherein the mounting member removably couples with the clamping element of the display device such that display device is rotatable about the vertical axis.

13. The display system of claim 9, wherein the at least one coupling element includes a pair of coupling elements.

14. The display system of claim 9, wherein the at least one projection includes a magnet.

* * * * *